United States Patent
Afshar et al.

(10) Patent No.: US 10,687,106 B2
(45) Date of Patent: Jun. 16, 2020

(54) SYSTEM AND METHOD FOR DISTRIBUTED CONTROL OF SEGMENTED MEDIA

(71) Applicant: i4Vu, Inc., Sunnyvale, CA (US)

(72) Inventors: Dariush Hale Afshar, Campbell, CA (US); Robert Owen Eifrig, Sunnyvale, CA (US); Scott Blair Steele, Naperville, IL (US)

(73) Assignee: i4Vu, Inc., Sunnyvale, CA (US)

( * ) Notice: Subject to any disclaimer, the term of this patent is extended or adjusted under 35 U.S.C. 154(b) by 0 days.

(21) Appl. No.: 15/934,962

(22) Filed: Mar. 24, 2018

(65) Prior Publication Data
US 2019/0297370 A1  Sep. 26, 2019

(51) Int. Cl.
| | | |
|---|---|---|
| H04N 21/2343 | (2011.01) | |
| H04N 21/235 | (2011.01) | |
| H04N 21/24 | (2011.01) | |
| H04N 21/2543 | (2011.01) | |
| H04N 21/262 | (2011.01) | |
| H04N 21/43 | (2011.01) | |
| H04N 21/435 | (2011.01) | |
| H04N 21/442 | (2011.01) | |
| H04N 21/278 | (2011.01) | |
| H04L 29/06 | (2006.01) | |
| H04N 21/258 | (2011.01) | |

(52) U.S. Cl.
CPC ......... *H04N 21/278* (2013.01); *H04L 65/607* (2013.01); *H04L 65/80* (2013.01); *H04N 21/25825* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 10,432,690 B1 * | 10/2019 | Li | H04L 65/607 |
| 2015/0074232 A1 * | 3/2015 | Phillips | H04N 21/25833 709/219 |
| 2017/0280178 A1 * | 9/2017 | Sun | H04L 47/286 |
| 2018/0084018 A1 | 3/2018 | Arky | |

OTHER PUBLICATIONS

U.S. Appl. No. 15/688,823, Non final Office Action dated Sep. 20, 2018, 9 pp.

* cited by examiner

*Primary Examiner* — Brian T Pendleton
*Assistant Examiner* — Jean D Saint Cyr
(74) *Attorney, Agent, or Firm* — Lathrop GPM LLP

(57) ABSTRACT

A control server in communication with one or more a content delivery network (CDN) node and a client device may include a client controller configured to receive a plurality of manifests from the one or more CDN defining a plurality of content segments of a master content available at the CDN, and receive client information from the client device. The control server may generate, based on the client information, synchronized manifests for each of a plurality of client device media players of the client device to control synchronous display at the client device of a plurality of programs selected at the client device.

16 Claims, 8 Drawing Sheets

SYSTEM AND METHOD FOR DISTRIBUTED CONTROL OF SEGMENTED MEDIA

BACKGROUND

Consumer devices such as tablet computers and smartphones are increasingly being used to receive and view video programs. However, it is still cumbersome for a user to use the user's device to browse through a selection of available video programs.

Popularity of the Internet as the network for video delivery to users continues to grow. Internet Protocol (IP) packets allow seamless video delivery over heterogeneous networks such as wired and wireless networks. As the computational power of user devices such as mobile phones and tablet computers grows, so does a user's ability to receive and view multiple and/or higher bandwidth video programs.

SUMMARY OF THE EMBODIMENTS

In a first aspect, a system for distributed control of segmented media, includes: a control server in communication with one or more content delivery network (CDN) nodes and a client device. The control server includes a client controller configured to: receive, respectively for a plurality of programs, a manifest from the one or more CDN defining a plurality of content segments of a master content available at the CDN, receive client information from the client device, the client information including a selection of a plurality of programs, and generate at the control server and transmit to the client device, a plurality of synchronized manifests, based on the client information, such that each of the selected plurality of programs play synchronously at the client device.

In embodiments of the first aspect, the control server is further configured to identify a preliminary manifest for each of the received manifests from the one or more CDN.

In embodiments of the first aspect, each of the preliminary manifests include a plurality of content segments.

In embodiments of the first aspect, each of the preliminary manifests include a reference time.

In embodiments of the first aspect, the reference time is a synchronized presentation timestamp (SPTS) of the frame beyond the last frame of the last segment in each of the preliminary manifests.

In embodiments of the first aspect, the number of content segments in each of the synchronized manifests being less than the number of content segments in the associated preliminary manifest for each given program.

In embodiments of the first aspect, each of the preliminary manifests is identified by the control server based on a window size communicated by the client device such that each preliminary manifest identifies a variant manifest, of the master content, for a peak resolution corresponding to a window size associated with the program when displayed on the client device.

In embodiments of the first aspect, each of the preliminary manifests is identified by the control server based on a total bandwidth and a bandwidth used by a plurality of client devices on the same network and in communication with the control server.

In embodiments of the first aspect, each of the preliminary manifests is identified based on a resolution of the program when displayed at the client device.

In embodiments of the first aspect, each of the preliminary manifests is identified based on a player rate buffer level for each of the client media players.

In embodiments of the first aspect, each of the preliminary manifests is identified based on total memory and memory used by the client device media players.

In a second aspect, a method for distributed control of segmented media, includes: receiving, at a control server, a plurality of manifests from one or more a content delivery network (CDN) node respectively defining a plurality of content segments of a master content available at the one or more CDN, receiving, at the control server, client information from a client device, the client information including a selection of a plurality of programs; and generating, at the control server, a plurality of synchronized manifests, based on the client information, such that each of the selected plurality of programs play synchronously at the client device.

In embodiments of the second aspect, the method further comprises identifying a preliminary manifest for each of the received manifests from the one or more CDN.

In embodiments of the second aspect, each of the preliminary manifests include a plurality of content segments.

In embodiments of the second aspect, each of the preliminary manifests include a reference time.

The method of claim 15, the reference time being a synchronized presentation timestamp (SPTS) of the frame beyond the last frame of the last segment in each of the preliminary manifests.

In embodiments of the second aspect, the number of content segments in each of the synchronized manifests is less than the number of content segments in the associated preliminary manifest for each given program.

In embodiments of the second aspect, each of the preliminary manifests is identified based on a window size communicated by the client device such that each preliminary manifest identifies a variant manifest, of the master content, for a peak resolution corresponding to a window size associated with the program when displayed on the client device.

In embodiments of the second aspect, each of the preliminary manifests being identified by the control server based on a total bandwidth and a bandwidth used by a plurality of client devices on the same network and in communication with the control server.

In embodiments of the second aspect, each of the preliminary manifests is identified based on a resolution of the program when displayed at the client device.

In embodiments of the second aspect, each of the preliminary manifests is identified based on a player rate buffer level for each of the client media players.

In embodiments of the second aspect, each of the preliminary manifests is identified based on total memory and memory used by the client device media players.

In a third aspect, a system for distributed control of segmented media, comprises: a control server in communication with one or more content delivery network (CDN) nodes and a client device, the control server including a client controller configured to: receive, respectively for a plurality of programs, a manifest from the one or more CDN defining a plurality of content segments of a master content available at the CDN, receive client information from the client device, the client information including a selection of a plurality of programs, and generate at the control server and transmit to the client device, a plurality of manifests determined based on the client information.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Figure 1:
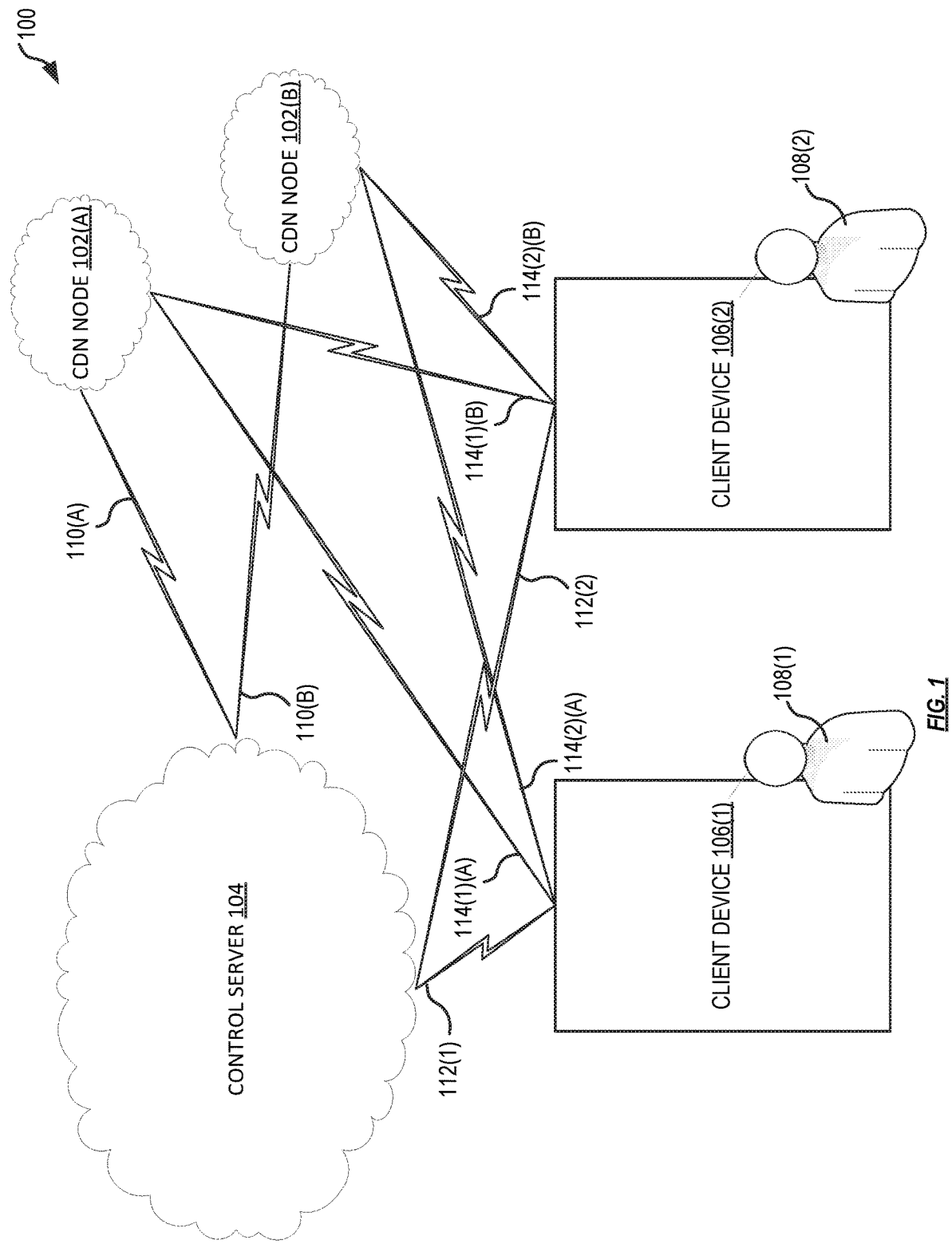
FIG. 1 depicts a system for distributed control of segmented media, in embodiments.

Content delivery to user devices is becoming more and more popular with ever increasing data transmission speeds and evolution of "cloud" based internet streaming services. Moreover, the user devices themselves have increasing capabilities, such as the ability to use multiple media windows at the same time on the same device. The problem arises that each video window (e.g. an active player instance) competes with the other video windows for available bandwidth with respect to (1) the given device, but also (2) other devices on the same network. The resulting situation is that one device (or a given player instance in a single device) uses high-quality content while other devices (or player instance(s) in the single device) suffer poor quality of service due to lack of timely content delivery caused by bandwidth issues. In other words, each player instance is unaware of its peers, and thus is unable to share the network in a way that allows all instances (or devices) to function subject to an overall bandwidth limit.

Embodiments herein resolve the above described, and other, problems and limitations by using a content control server to monitor the user client configuration (for example, but not limited to, bandwidth, memory occupancy, content requested, etc.). Based on the client configuration the control server may select one of the available content variants (e.g. based on bit rate and resolution) for each player instance in that device (or in other devices). The client may have no choice in the variant available for play because the control server controls the client (or specific player instance therein) by providing the one and only content variant advertised to each client instance by constructing a unique player manifest for each player instance in each client. One or more items of client configuration information may be periodically reported to the control server, and based on these reports, the particular variant selected for a client instance may be changed. All content is considered to be "live" (as opposed to recorded or video on demand ("VoD")), and only a small amount of content is made available to each client instance with each player manifest request. As such, repeated interaction between each client and the content control server enables the server to change content variants frequently, thereby improving the overall bandwidth management of the system (i.e., for all player instances on all client devices).

Embodiments herein may use any one or more of the following constraints. These constraints may be optional, and are not limiting in scope unless specifically claimed, stated, or otherwise indicated as required.

Embodiments may use segmented multi-bitrate video delivered via HTTP. This video may be delivered over TCP/IP using standards such as, but not limited to, dynamic adaptive streaming over HTTP ("DASH"), HTTP Live Streaming ("HLS"), or HTTP Dynamic Streaming ("HDS"). The TCP/IP may be advantageous, in embodiments, to provide reliable point-to-point delivery of the content, and the adaptivity may allow a choice of different effective bitrates based on network performance (e.g., time varying throughput and congestion) and client device characteristics (e.g., window resolution, memory available, etc.). In all of the above standards, the client is typically provided a choice of different variants of the content (differing by bitrate and resolution) and has the ability to switch between content variants at segment boundaries. The available variants are advertised to the client by means of a manifest object which specifies the bitrate and resolutions (among other attributes) available.

The embodiments herein may interface with existing media players (e.g., using JavaScript wrappers) and decoders used on and by the client device for a given player instance. As such, embodiments herein may provide the advantage of improving the user's investment in client software based on these existing player packages by providing solutions which not only coexist but build upon the features provided by these existing player packages.

Embodiments herein may use, for wide area distribution of audiovisual content on the public internet, and the value provided by content delivery networks ("CDNs"). CDNs typically use specialized domain name servers to connect to an edge server, which is both close (in network topology) to the client device and lightly loaded in order to provide a high quality of service. The CDNs may provide HTTP caching and streaming (continuous one-way video distribution between the origin server and the various geographically dispersed edges) services.

Embodiments herein may use HTTP or HTTPS communication protocol (over standard TCP ports (e.g., ports 80 and 443)) between individual components of the system (e.g. between the control server and the client device, the control server and a CDN, and/or the client device and the CDN). As such, the system herein may avoid issues arising due to network firewalls.

Figure 2:
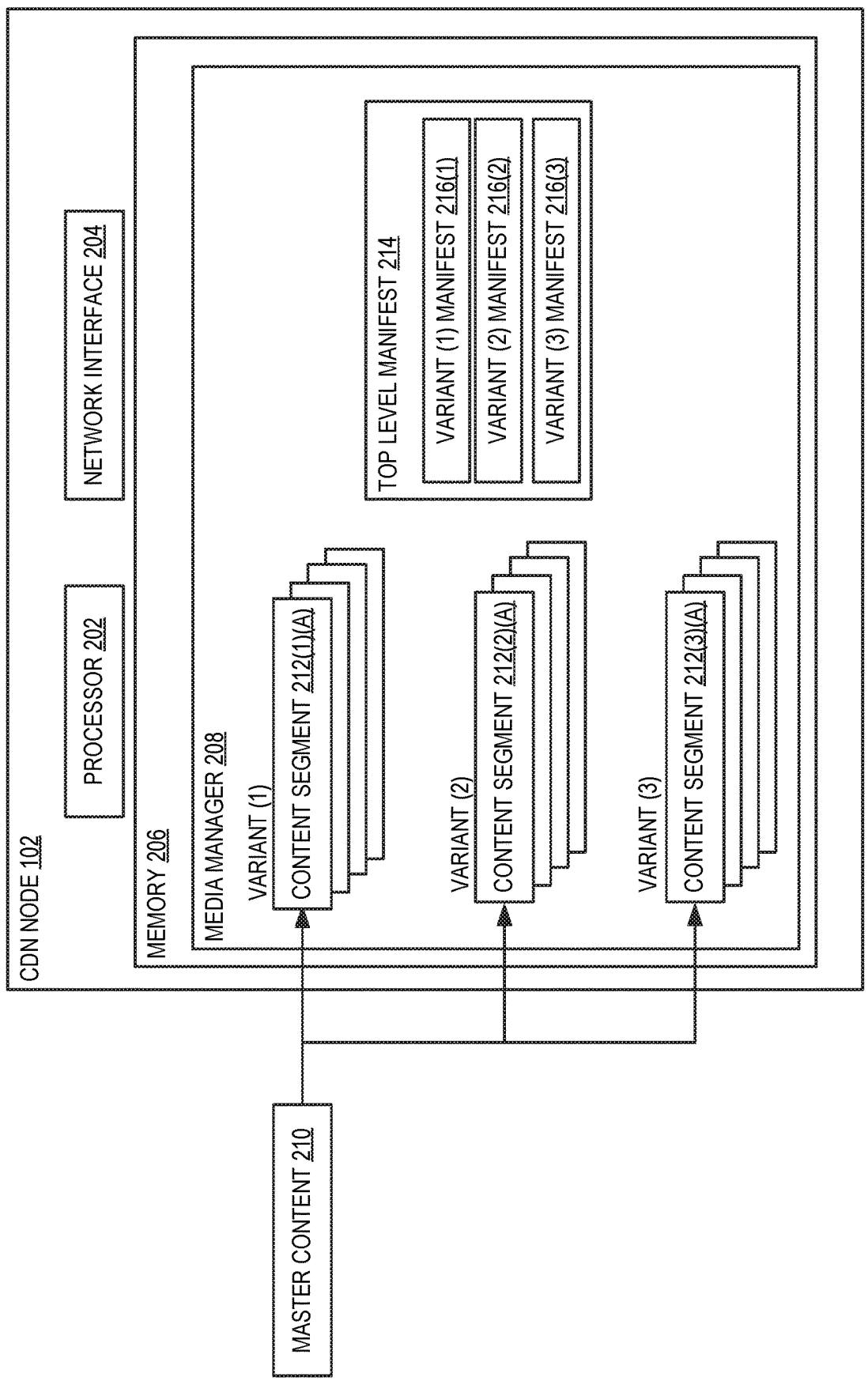
FIG. 2 depicts the CDN of FIG. 1, in further detail, in embodiments.
Figure 3:
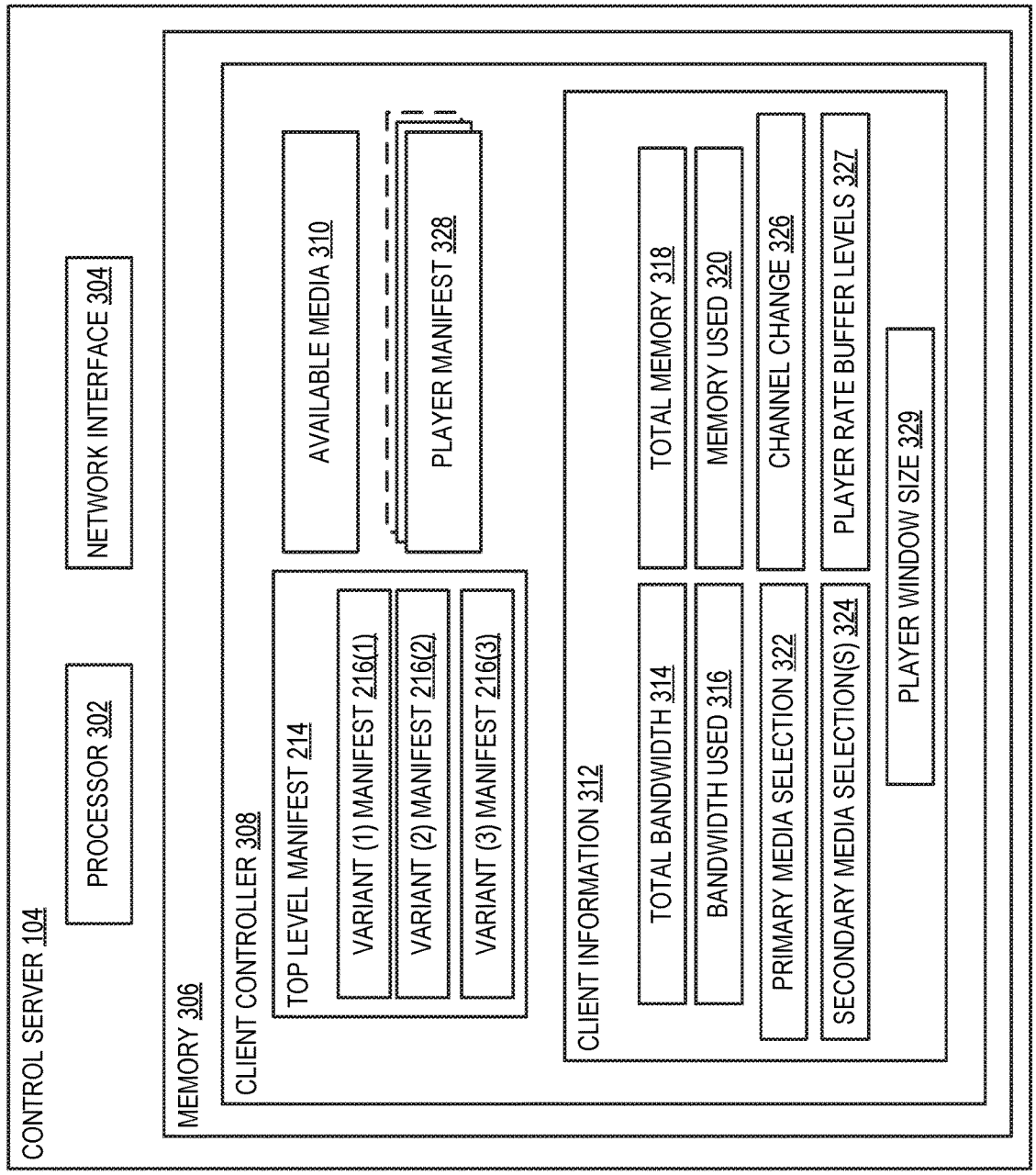
FIG. 3 depicts the control server of FIG. 1, in further detail, in embodiments.
Figure 4:
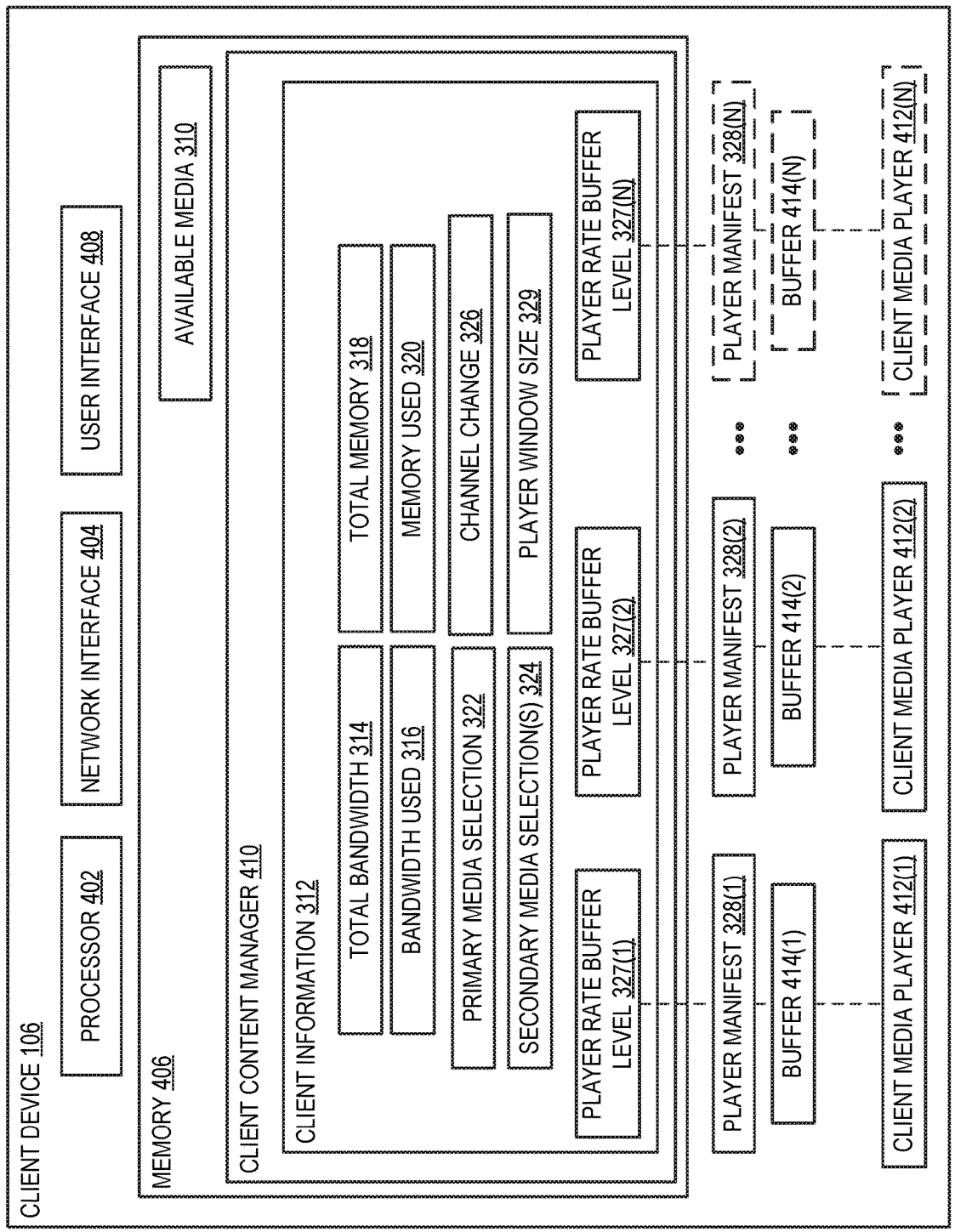
FIG. 4 depicts the client device of FIG. 1, in further detail, in embodiments.

FIG. 1 depicts a system 100 for distributed control of segmented media, in embodiments. FIG. 2 depicts the CDN 102, of FIG. 1, in further detail, in embodiments. FIG. 3 depicts the control server 104, of FIG. 1, in further detail, in embodiments. FIG. 4 depicts the client device 106, of FIG. 1, in further detail, in embodiments. FIGS. 1-4 are best viewed together with the following description.

System 100 includes at least one content delivery network ("CDN") node 102, a control server 104, and at least one client device 106 used by a respective user 108. It should be appreciated that only two CDN nodes 102(A), 102(B), and only two user devices 106(1), 106(2), are illustrated in FIG. 1, more or fewer CDN nodes 102 and/or user devices 106 may be implemented without departing from the scope hereof. Moreover, it should be appreciated that each user 108 may use more than one client device 106. As such, users 108(1), 108(2) may be the same or distinct users without departing from the scope hereof. Each CDN node 102 may be in communication with control server 104 via a first communication path 110. The control server 104 may be in communication with each respective client device 106 via a second communication path 112. Each CDN node 102 may be in communication with each respective user device via a third communication path 114.

As shown in FIG. 2, each CDN node 102 may include a processor 202, a network interface 204, and memory 206.

Processor 202 may be one or more computing devices capable of executing computer readable instructions to implement functionality of the CDN node 102 as discussed herein.

Network interface 204 may be 1) a wired communication protocol, such as telephone, Ethernet, fiber optics, Cable, USB, lightning cable, or other wired communication protocols, 2) a wireless communication protocol, such as Bluetooth, Bluetooth low-energy (BLE), WiFi, cellular 2G, 3G, 4G, 5G, LTE, or any other wireless communication protocol, or 3) a combination of wired and wireless communication protocols. Network interface 204 may be used to facilitate one or more of first communication path 110 and third communication path 114 according to the above described wired and/or wireless communication protocols.

Memory 206 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory. Memory 206 may store a media manager 208, which may include transitory and/or non-transitory computer readable instructions that when executed by the processor 202 implement the following functionality.

Media manager 208 may receive master content 210 and segment said master content 210 into one or more content segments 212. Although only a single master content 210 is shown, it should be appreciated there may be additional master contents 210 for a given CDN node 102 without departing from the scope hereof. As shown in FIG. 2, each master content 210 may be segmented into one or more variants (labeled (1)-(3)). And each variant may include one or more content segments. As such, the nomenclature "212 (1)(A)" indicates the "A" segment, of a given content segment 212, for variant "1". It should be appreciated that although only three variants of master content 210 are shown in FIG. 2, there may be more or fewer variants without departing from the scope hereof. Moreover, although there is shown as having 4 (or "D") content segments within a given variant, there may be more or fewer segments without departing from the scope hereof. Also, for a given master content 210, there may be a different, or the same, number of segments within each variant.

Master content 210 need not be the same format as any of the segments 212. For example master content 210 may be in the format of any one or more of FLV, MPEG2 transport stream, MP4, while any given segment may be in the format of any one or more of MPEG2-TS or fragmented MP4 media segments. As such, master content 210 may be decoded (or transcoded) via a media manager 208, or an external decoding/transcoding device prior to storage within memory 206 as one or more content segments 212. Moreover, each variant may be configured to store a different media format.

As each master content 210 is segmented into variant(s), media manager 208 stores a top-level manifest 214. In embodiments using HLS, the top-level manifest 214 may be a "Master Playlist" and a variant manifest 216 may be a "Media Playlist". In embodiments using MPEG-DASH, there may only be a top-level manifest 214 as a single manifest called a "Media Presentation Description (MPD)" document. Each type of delivery (e.g., HLS, DASH, HDS) may include a different manifest format, and has a separate top-level manifest 214. In the embodiment of FIG. 2, only one of these types of manifests need be processed. Top-level manifest 214 indicates all variant types for a given master content 210 and for a given delivery format. Moreover, each top-level manifest 214 may include references to one or more variant manifests 216, which are sub-manifests indicating the characteristics of each content segment 212 for the given variant. As such, each variant manifest 216 may include a time duration, and URL location, etc. for each content segment 212. For example, variant manifest 216 for HLS delivery may include one or more tags, such as master player tags, media player tags, and segment tags, and further includes one or more URLs associated with media segments. The only required tag for each media segment is the EXTINF tag, which specifies segment duration. The only required tag for a variant in a master playlist is the EXT-X-STREAM-INFO tag, which is followed by the URI of the media playlist for that variant. Each variant (e.g., 1080p, 720p, 480p, 2K, 4K UHD) is separately segmented and stored into multiple segments 212, where for example, each segment 212 may be two to four seconds long. It should be appreciated that the disclosure hereof is not limited to 2-4 second segments, or the above listed variants.

Turning now to FIG. 3, control server 104 may include a processor 302, network interface 304, and a memory 306. Control server 104 may be integrated into one of the CDN nodes 102 without departing from the scope hereof.

Processor 302 may be one or more computing devices capable of executing computer readable instructions to implement functionality of the control server 104 as discussed herein.

Network interface 304 may be 1) a wired communication protocol, such as telephone, Ethernet, fiber optics, Cable, USB, lightning cable, or other wired communication protocols, 2) a wireless communication protocol, such as Bluetooth, Bluetooth low-energy (BLE), WiFi, cellular 2G, 3G, 4G, 5G, LTE, or any other wireless communication protocol, or 3) a combination of wired and wireless communication protocols. Network interface 304 may be used to facilitate one or more of first communication path 110 and second communication path 112 according to the above described wired and/or wireless communication protocols.

Memory 306 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory. Memory 306 may store a client controller 308, which may include transitory and/or non-transitory computer readable instructions that when executed by the processor 302 implement the following functionality.

Control server 104 may receive the top-level manifest 214 and associated variant manifests 216 from one or more of the CDN nodes 102 via each respective first communication paths 110. As such, although only a single top-level manifest 214 is illustrated in FIG. 3, it should be appreciated that there may be any number of top-level manifests and associated variant manifests within memory 306.

Client controller 308 may analyze one or more of the top-level manifests 214 and associated variant manifests 216 to identify a list of available media 310 for streaming to one or more of the client devices 106. Available media 310 may be transferred to each client device 106 via respective ones of second communication paths 112. Available media 310 may provide a guide to the user 108 via interaction with an interface of the client device 106. The guide may be a list, or may be interactive such as the user interface(s) depicted in FIGS. 11-27 of U.S. Pat. No. 9,582,157, entitled "User Interface and Program Guide for a Multi-Program Video Viewing Apparatus" which is incorporated herewith in its entirety.

Client controller 308 may receive, via respective second communication paths 112 and from each respective client device 106, client information 312. Client information 312 may include any control message parameter, such as one or more of: total bandwidth 314, bandwidth used 316, total memory 318, memory used 320, primary media selection 322, secondary media selection(s) 324, a channel change indication 326, and player rate buffer levels 327, and a player window size 329. Player rate buffer levels 327 provided by the client device 106 is used for bandwidth management, for example (e.g., a player rate buffer level is provided for each client media player). Client Information 312 may further include one or more of screen width and height, browser type, device name and version, protocol type (e.g. HLS, HDS, DASH), window sizes, content URLs, seek timestamps, and change timestamps.

Based on client information 312, and top-level manifest 214 indicating various variant manifests 216, client controller 308 may generate a player manifest 328 for each client media player (e.g., client media player 412, FIG. 4, of each client device 106). Player manifest 328 is in the form of a "live" manifest (as opposed to a VoD manifest). HLS refers to "live" manifests as "Event" manifests. Each player manifest 328 is dynamic in the sense that when accessed they contain a small number of segments around the playhead position, and they are updated frequently and are downloaded continuously. In contrast, VoD manifest need only be downloaded once since it contains all of the segments in the program. Additional detail on the generation of player manifest 328 is discussed in further detail below.

Turning now to FIG. 4, client device 106 may include a processor 402, network interface 404, a memory 406, and a user interface 408. Client device 106 may be any device used by a user 108, including but not limited to a computer, laptop computer, mobile phone, tablet, kiosk, television, or any other such media playing electronic device.

Processor 402 may be one or more computing devices capable of executing computer readable instructions to implement functionality of the client device 106 as discussed herein.

Network interface 404 may be 1) a wired communication protocol, such as telephone, Ethernet, fiber optics, Cable, USB, lightning cable, or other wired communication protocols, 2) a wireless communication protocol, such as Bluetooth, Bluetooth low-energy (BLE), WiFi, cellular 2G, 3G, 4G, 5G, LTE, or any other wireless communication protocol, or 3) a combination of wired and wireless communication protocols. Network interface 404 may be used to facilitate one or more of second communication path 112 and third communication path 114 according to the above described wired and/or wireless communication protocols.

User interface 408 may be any interface, such as a touch screen, display screen with mouse and/or keyboard, voice interface, video interface, or any other device capable of interacting with user 108 via client device 106.

Memory 406 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory. Memory 406 may store a client content manager 410, which may include transitory and/or non-transitory computer readable instructions that when executed by the processor 402 implement the following functionality.

Client content manager 410 may be implemented from a software development kit (SDK) and used on the client as an interface between CDN nodes 102, control server 104, and one or more media players 412 located on the client device. Media players 412 may be any client software package used for playing media on client device. One or more media players 412 may be configured to provide multiple streaming media (e.g. video, audio, or other media) windows at the same time. Each client media player 412 will "play" one or more media according to a corresponding player manifest 328. That is, each client media player 412 uses a separate player manifest 328 that is generated by client controller 308 of control server 104. For example, each player manifest 328 includes a URL where the streaming media content is located on CDN node 102 and the corresponding client media player 412 contacts the associated CDN node 102, using the URL, and accesses the media file thereat for play by the client media player 412.

Multiple variables affect the ability of media to stream properly on client device 106, and multiple client devices 106 when implemented. Accordingly, client content manager 410 may monitor the total bandwidth 314 and the bandwidth being used 316 by the client device, and particularly by each client media player 412 while playing media from each of CDN nodes 102 according to player manifest 328. Client content manager 410 may further monitor the total memory 318 and the memory being used 320 within the memory buffers 414 of the client device 106 to determine player rate buffer levels 327. Client content manager 410 may further identify the required resolution (and identify said resolution in the primary media selection 322 and/or secondary media selection(s) 324) based on the window size that the media is to be displayed on client device 106. Client content manager 410 then transfers this information 312 to control server 104 such that control server 104 may determine the appropriate content segments 212 (including the appropriate variant of the master content 210) such that all media streaming is satisfactory for all client media players 412 on all client devices 106 by minimizing bandwidth errors during playback. The control server 104 then controls each client media player 412 of the client devices 106 by generating the player manifest 328 to include only information of the appropriate content segments 212 and then transferring the player manifests 328 to the client devices 106.

Transfer of information 312 to control server 104, and generation of player manifests 328 (and identification of manifests 214, 216) is repeated periodically or aperiodically by control server 104 such that control server 104 is able to effectively buffer streaming media to the client device 106. By managing multiple client devices 106 at the same time, control server 104 also manages network bandwidth usage by the client devices and CDN nodes 102.

Bandwidth and memory management control by control server 104 also provides seamless interaction with client device 106 by user 108 while watching multiple media instances on one or more client media players 412. As shown in, for example, FIGS. 3 and 4 of U.S. Pat. No. 9,582,157 (incorporated by reference in its entirety), a client device 106 may display a primary video and one or more secondary videos. The media selection of user 108 for the primary video is stored in client information 312 as primary media selection 322, and the secondary media selection(s) are stored as secondary media selection(s) 324. In embodiments, the player manifest 328 may identify a first variant having a first resolution for displaying the primary media selection 322, and a second variant having a second resolution lower than the first resolution for the one or more second media selection(s) 324. A user, at any time, may "change channels" by interacting with user interface 304 to select one of the secondary media selection(s) 324 (or any other media content not previously identified in information 312 that is available) to be shown as the primary media selection 322. At such time, the primary media selection 322 and the secondary media selection(s) 324 are changed and updated client information 312 is transmitted to control server 104 from client device 106. Control server 104 then analyzes the updated client information 312 to generate new player manifests 328 (one per client media player 412) which are transmitted to client device 106. Within client device 106, each client media player 412 then continues to operate by pulling the appropriate media content segments 212 from the CDN nodes 102 as defined by the new player manifests 328. This process allows for content switching at the client device 106 within the flow of the same player manifest 328 (e.g., without requiring the media player to restart and begin pulling a new player manifest representing the new content). This advantageously allows for seamless content switching by eliminating the need for the player to restart and pull a new player manifests, which disrupts the presentation of content at the client device 106.

Player manifest 328 may allow the client media player 412 some variability in selecting the variant. For example, in some embodiments, the player manifest 328 may include some, but not all, of the variants 216 identified in the top-level manifest 214. For example, the player manifest 328 may include some of the variants 216 corresponding to different resolutions for selection by the client media player 412.

Player manifest 328 may select the variant 216 to transmit to the client media player 412 based upon the client information 312, such as based on the player window size 329. For example, the player window size 329 may dictate a peak resolution available for that window. As such, the player manifest 328 may identify the variant 216 corresponding to the peak resolution. In addition, or alternatively, the peak resolution may be identified based on bandwidth available over the network. For example, a peak resolution may be determined based a total bandwidth and a bandwidth used by a plurality of client devices 106 on the same network and in communication with the control server 104.

In one example, system 100 is used in a live sporting event. Each master content 210 may be a different camera, or video stream, of the live sporting event. The user 108 may include a desired camera angle as the primary media selection 322, and secondary camera angles as the secondary media selection(s) 324. The user 108 then may seamlessly shift between various master contents 210. Where the user 108 is at a specific venue, and multiple users 108 are connected to system 100, the bandwidth management becomes more important such that each user 108 is capable of receiving the live media streams.

Each user 108 may further include subscription access to various master contents 210, or to specific variant levels. For example, user 108 may buy into a "premium" subscription model where the control server 104 prioritizes the bandwidth for that given user (as well as others in that subscription model). Not only may the users 108 be part of a subscription model, but the content providers as well. For example, content providers may pay a premium such that their master content 210 is distributed at better variants (e.g. better resolution, higher bandwidth, etc.) than other content providers.

Specific control of client device 106 via control server 104 differs from prior systems that allow the client device to control what variant of the master content 210 the client device desires. Allowing the client device control of the desired variants causes bottlenecks in video content delivery because the client is unaware of the available bandwidth, and/or what other devices are attempting to stream. Also, allowing each client media player independent control over the variant pulled does not account for what other client media players are attempting to stream. Controlling video delivery through the network to multiple client media players and client device allows scalability that was previously unachievable.

Control server 104, in embodiments, also allows for consolidation of different CDN nodes 102 into a single system. For example, control server 104 may ingest manifests 214 from different CDN nodes 102. The centralized control server 104 may then manipulate the different constraints of each CDN node 102 and distribute a single player manifest 328 that accommodates these different constrains.

Figure 5:
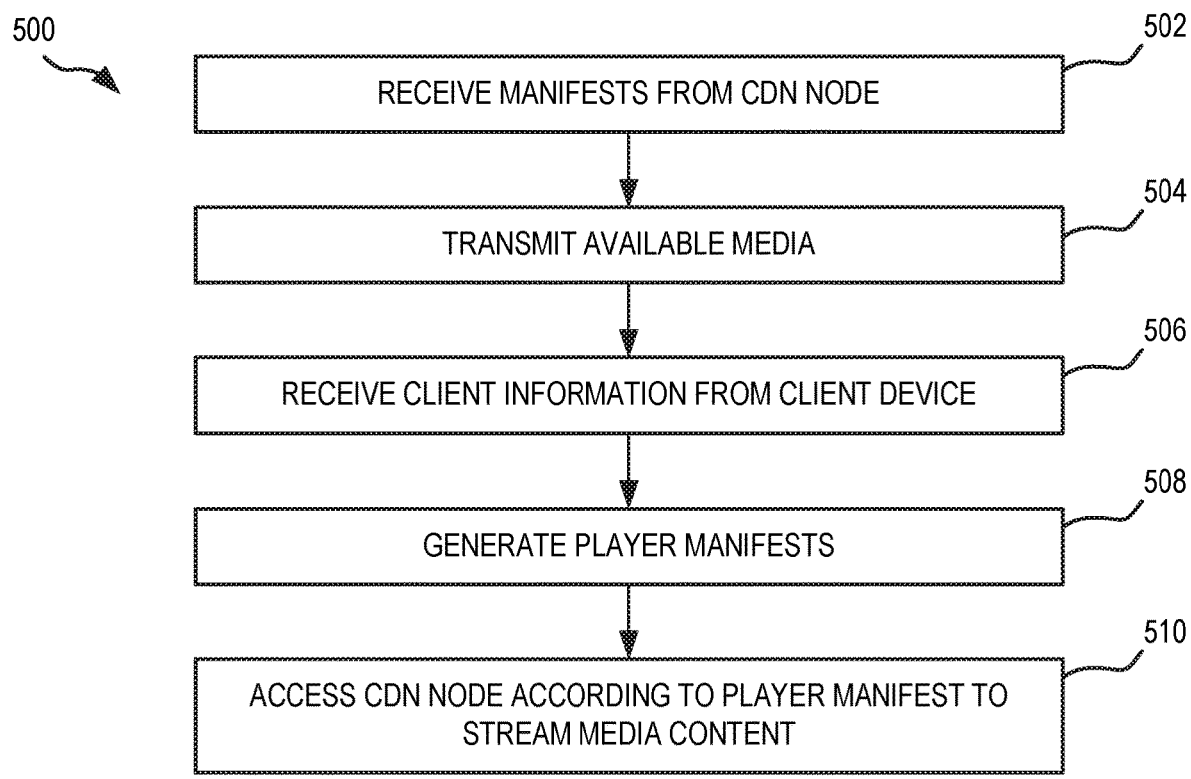
FIG. 5 depicts a method for distributed control of segmented media, in embodiments.

FIG. 5 depicts a method 500 for distributed control of segmented media, in embodiments. Method 500 is for example implemented using system 100 discussed above with respect to FIGS. 1-4.

In step 502, method 500 receives manifests from a CDN node. In one example of step 502, control server 104 receives a top-level manifest 214 including one or more variant manifests 216 from a CDN node 102. Step 502 may be repeated for multiple top-level manifests 214 and variant manifests 216. The received manifests may then be stored within control server 104 for further processing.

In step 504, method 500 transmits available media to a client device. In one example of step 504, control server 104 transmits available media 310 to client device 106.

In step 506, method 500 receives client information from a client device. In one example of step 506, control server 104 receives client information 312 from client device 106. In embodiments, client information 312 may include total bandwidth 314 and bandwidth used 316 associated with client device 106. In embodiments, client information 312 may include (additionally or alternatively) total memory 318 and total memory used 320 by client media player 412. In embodiments, client information 312 may include (additionally or alternatively) primary media selection 322 and secondary media selection(s) 324. In embodiments, client information 312 may include (additionally or alternatively), channel change information 326 identifying user interaction with user interface 408 to update one or both of primary media selection 322 and secondary media selection(s) 324. Step 506 may be repeated for any number of client devices 106 within system 100.

In step 508, method 500 generates one player manifest for each client media player. In one example of step 508, control server 104 generates one player manifest 328 for each client media player 412. For example, control server 104 may use the manifests received in step 502, and the client information received in step 506 to generate a satisfactory player manifest 328 for each client media player 412. Step 508 may allow an individual client device and/or the entire network to be optimized such that multiple clients are capable of accessing content on CDN nodes 102.

In step 510, method 500 accesses the CDN node(s) according to the player manifest generated in step 508 to stream media content. In one example of step 510, each client media player 412 within client device 106 initiates contact between the client device 106 and the CDN node 102 according to the corresponding player manifest 328.

Multiple Synchronized Programs:

With the increased demand for streaming and on-demand content, users continue to desire additional options for viewing the content. One such option is to stream multiple programs at the same time. In the case where the multiple programs are directed towards the same general content (e.g., multiple views of a video game stream, multiple views of sports stream, multiple views of news programs, multiple views of music/concert related content, etc.), it is desirable to synchronize the multiple views such that there is minimal differential delay among the programs that are displayed on the client device. The systems and methods described herein further allow not only for bandwidth management as discussed above, but also synchronization of multiple programs displayed on a single client device (e.g., synchronization between the content played according to player manifests 328(1)-328(N) on each client media player 412(1)-412(N) of client device 106, respectively).

Prior systems for synchronous play of multiple programs require special algorithms located on the client device that synchronize multiple programs, or works only with MPEG-DASH content. These systems are not compatible for synchronous play using HLS delivery.

Figure 6:
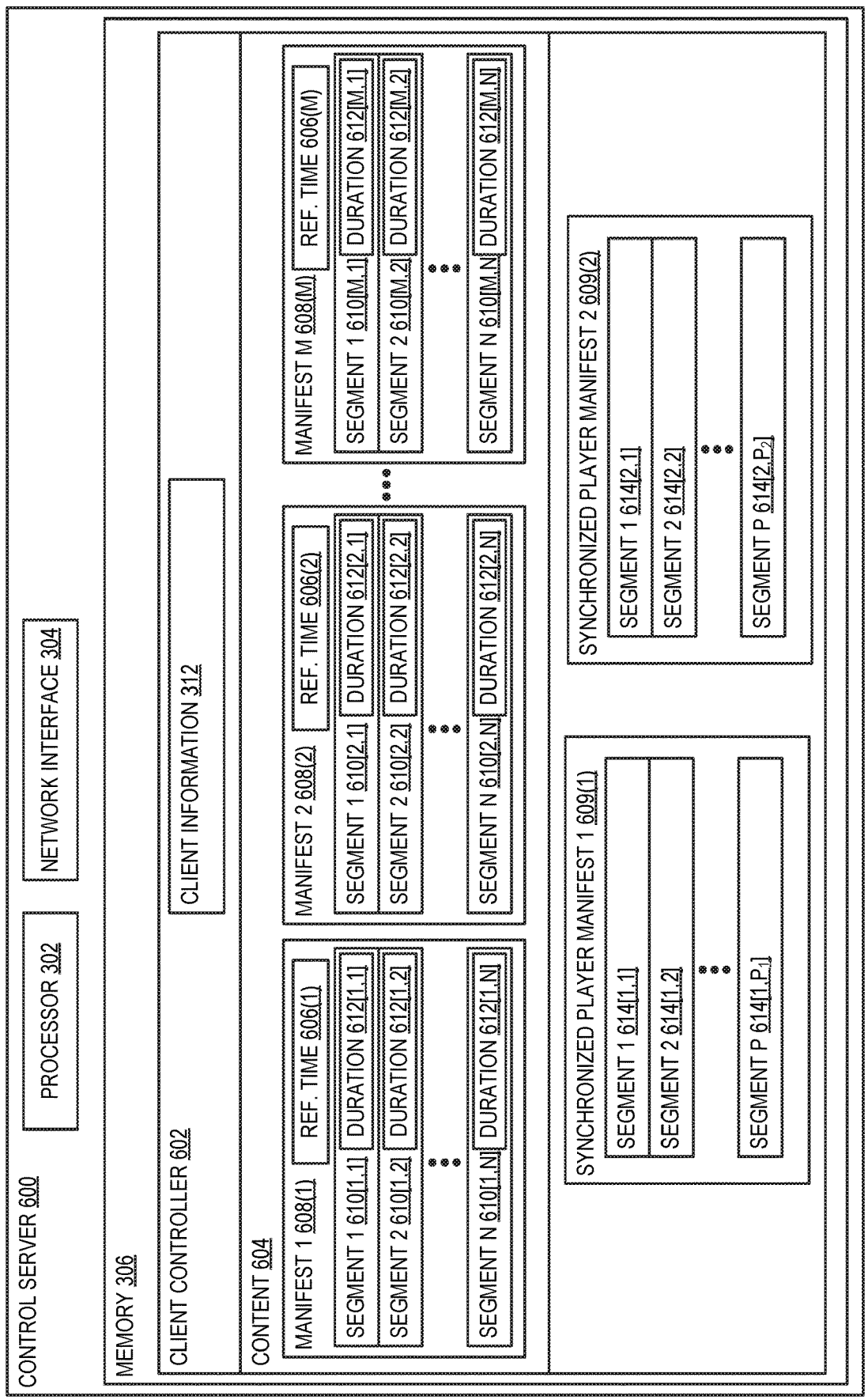
FIG. 6 depicts a control server, which is an embodiment of the control server of FIG. 1 configured to generate synchronized multiple programs for display on a single instance of the client device, in embodiments.

FIG. 6 depicts a control server 600, which is an embodiment of the control server 104 of FIG. 1 configured to generate synchronized multiple programs for display on a single instance of the client device 106, in embodiments.

The control server 600, in embodiments, includes some or all of the above described features and functionality of the control server 104. As such, the control server 600 includes the processor 302, the network interface 304, and the memory 306, as discussed above. The memory 306 stores a client controller 602 which may include some or all of the features and functionality of the client controller 308 discussed above. As such, the client controller 602 receives the client information 312 from the client device 106 as discussed above. The client information 312 may include, although not shown in FIG. 6, one or more of total bandwidth 314, bandwidth used 316, total memory 318, memory used 320, primary media selection 322, secondary media selection(s) 324, a channel change indication 326, and player rate buffer levels 327, and a player window size 329.

The client controller 602 includes computer readable instructions that when executed by the processor 302 operate to analyze content 604 to generate multiple synchronized player manifests 609 that are transmitted to the client device 106. Although only two synchronized player manifests 609 are shown, it should be appreciated that more than two synchronized manifests 609 may be generated without departing from the scope hereof.

Content 604 includes a plurality of preliminary manifest 608(1)-608(M). Each preliminary manifest 608 includes a plurality of content segments 610(1)-610(N). Using the nomenclature shown in FIG. 6, segment 610[1,1] indicates the first content segment of the first preliminary manifest. Segment 610[1,N] indicates the Nth content segment of the first preliminary manifest. Each preliminary manifest 608 (1)-608(M) may represent a variant manifest 216 as discussed above. Each preliminary manifest 608(1)-608(M) may represent a program indicated in available media 310. Accordingly, it should be appreciated that generation of the synchronized player manifests 609 may occur before, concurrently, or after bandwidth, resolution, size, or other control determination to generate the player manifest(s) 328 discussed above.

Each preliminary manifest 608 may include a reference time 606. The client controller 602 may synchronize the manipulated manifests in time using the reference time 606. The reference time 606 may be included in the transmission of the manifests 216 from the CDN 102. The reference time 606 may indicate the synchronized presentation time of the frame beyond the last frame of the last segment 610[N] in a given preliminary manifest 608.

Furthermore, each segment 610 may have a duration 612 associated therewith. The duration 612 defines the play time of the segment 610. The client controller 602 may analyze the reference time 606 of each selected manifest 608 and then select particular content segments 610 for use as content segments 614 within each synchronized player manifest 609. Accordingly, each synchronized player manifest 609 includes a plurality of content segments 614(1)-614(P), where P may be less than or equal to the number "N" of content segments within the associated preliminary manifest 608.

An example of operation of generating synchronized player manifests 609 will now be described. The control server 600 may assist the client device 106 in synchronizing the presentation of multiple streams (e.g. manifests 608) using the reference time 606 in each manifest 608. In this particular example, the reference time 606 for each manifest 608 is a time entry in the HLS manifests delivered from the CDN 102. This time entry (reference time 606) indicates the synchronized presentation timestamp (SPTS) of the frame beyond the last frame of the last segment 610(N) in each given HLS manifest 608 for each content stream. From this reference time 606, the SPTS of the first frame of each segment 610(1)-610(N) can be calculated and associated with the segment (e.g. the duration 612). To generate the synchronized player manifests 609, each output queue of the synchronized player manifest 609 is generated by trimming (e.g., by skipping one or more of segments 610 in the associated preliminary manifest 608) from the beginning of the preliminary manifest 608 to find the earliest segment, n[k], of stream k such that $$SPTS[n[k],k] <= maxSPTS < (SPTS[n[k],k] + duration[n[k],k]);  \quad \text{EQ. 1:}$$

where maxSPTS is max{SPTS[n[k],k]} over all streams k (e.g., a stream is one of manifest 609); duration[n,k] is the duration of the nth segment 614 of the stream k. The arithmetic in Eq. 1 is performed in floating point seconds.

In some instances, it may be that the number and configurations of segments 610 do not allow a set of segments (n[k]) that satisfy the above condition in Eq. 1. In such instances, an alternative synchronization algorithm may be used. An alternative synchronization algorithm may include transmitting a separate periodic "Sync" message to the client device 106 containing each stream's media time offset from the wall clock time (e.g. reference time 606). This information allows the client 106 to sync the streams by offsetting their playback start times, or, if necessary, by seeking player(s) back in time to be in synchronization with the player which is the farthest behind.

Figure 7:
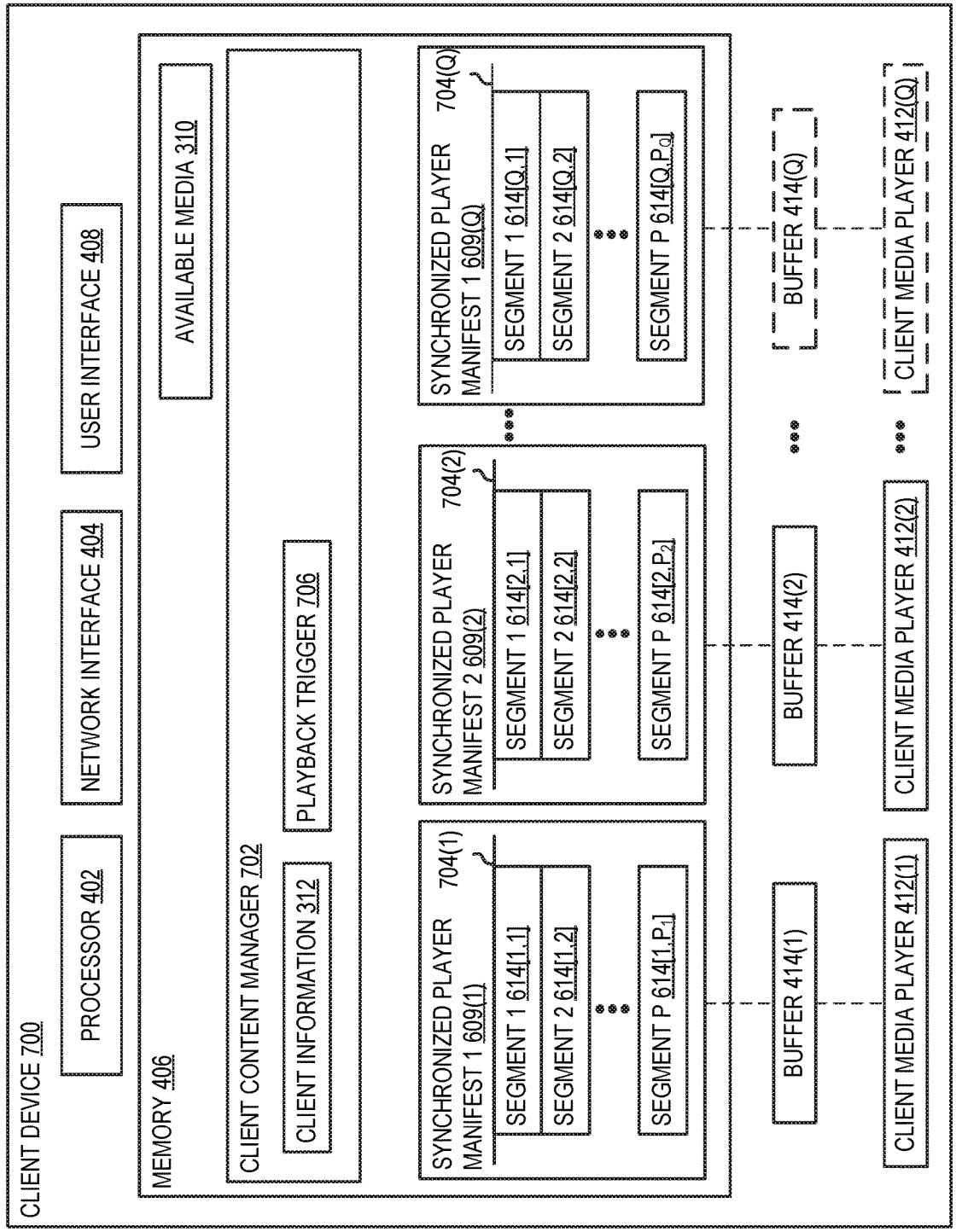
FIG. 7 depicts an example client device, which is an example of the client device of FIG. 1 that receives the synchronized player manifests of FIG. 6.

Upon generation of the synchronized player manifest 609, the control server 600 transmits the synchronized player manifest 609 to the client device 106. FIG. 7 depicts an example client device 700, which is an example of the client device 106 that receives the synchronized player manifests 609 of FIG. 6.

The client device 700, in embodiments, includes some or all of the above described features and functionality of the client device 106. As such, the client device 700 includes the processor 402, the network interface 404, the memory 406, and the user interface 408 as discussed above. The memory 406 stores the available media 310, discussed above, and a client content manager 702 which may include some or all of the features and functionality of the client content manager 410 discussed above. As such, the client content manager 702 generates the client information 312 and transmits the client information 312 to the control server 600 as discussed above. The client information 312 may include, although not shown in FIG. 7, one or more of total bandwidth 314, bandwidth used 316, total memory 318, memory used 320, primary media selection 322, secondary media selection(s) 324, a channel change indication 326, and player rate buffer levels 327, and a player window size 329.

The content streamed from the CDN 102 as determined by the segments 614 within each of the synchronized player manifests 609 (1)-609(Q) is placed in the buffers 414(1)-414(Q), respectively, and played by the respective client media player 412(1)-412(Q). Because the synchronized player manifests 609 are aligned at the control server 600, the client content manager 702 (and/or the client media player 412) simply utilizes its standard algorithm for determining the "live edge" 704(1)-704(Q) to which to playback the content associated with the synchronized player manifest 609 (1)-609 (Q), respectively. One such standard algorithm is determining a preset number of segments prior to the latest available segment. The client content manager 702 may include a playback trigger 706. The playback trigger 706 may include information regarding the client media players 412(1), such as delays associated with playing media streams, or in running the live edge determination algorithm, etc. As such, the client content manager 702 can control each respective client media player 412 at the appropriate time such that the streams associated with each of the synchronized player manifests 609 are played synchronously.

Figure 8:
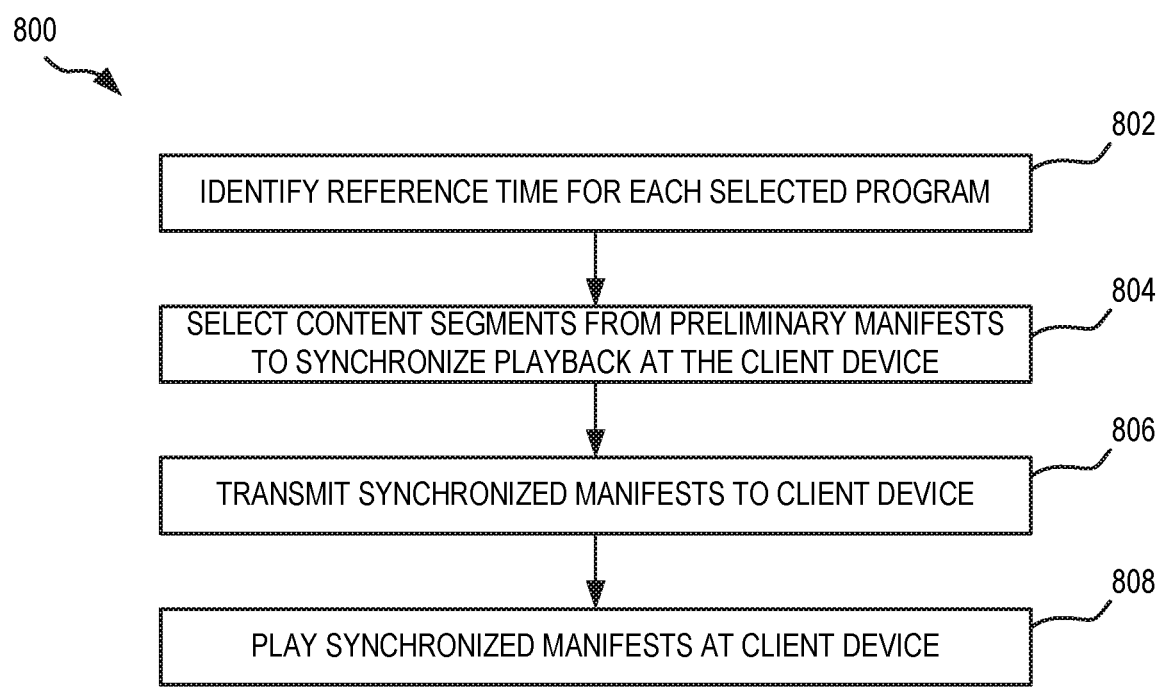
FIG. 8 depicts a method for distributed control of multiple, synchronized streams of segmented media, in embodiments.

FIG. 8 depicts a method 800 for distributed control of multiple, synchronized streams of segmented media, in embodiments. Method 800 is for example implemented using system 100 discussed above with respect to FIGS. 1-7. Method 800 is an example of step 508 of method 500 of FIG. 5, for example.

In step 802, method 800 identifies the reference time for each selected programs that are to be viewed and synchronized at the client device. In one example of step 802, the client controller 602 identifies each reference time 606 associated with the manifest 608 for the selected content as identified by two or more of the primary media selection 322 and/or secondary media selection(s) 324.

In step 804, method 800 selects content segments from the preliminary manifest associated with the selected programs to synchronize playback at the client device. In one example of step 804, the client controller 602 selects the content segments 610 to generate a synchronized player manifest 609 for each of the selected programs including a plurality of content segments 614. In an example of step 804, the selected content segments 614 are equal to or less than the number of selected content segments 610 in the preliminary manifest 608. In an example of step 804, the selected content segments 610 are chosen such that $$\text{SPTS}[n[k],k] <= \text{maxSPTS} < (\text{SPTS}[n[k],k] + \text{duration}[n[k],k]); \quad \text{EQ. 2:}$$

where maxSPTS is max{SPTS[n[k],k]} over all streams k (e.g., a stream is one of manifest 609); duration[n,k] is the duration of the nth segment 614 of the stream k. The arithmetic in Eq. 2 is performed in floating point seconds. In an example of step 804, the preliminary content segments 610 are trimmed in a manner that the selection is prioritized such that the initial segments 610 are not selected for inclusion in the synchronized player manifest 609.

In step 806, the selected content segments from step 804 are packaged into synchronized manifests and transmitted to the client device. In one example of step 804, the synchronized manifests 609 are transmitted to the client device 700.

In step 808, the synchronized manifests are played at the client device. In one example of step 804, the client content manager 702 may control each of the client media player 412(1)-412(Q) to play their respective content according to the playback trigger 706.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for distributed control of segmented media, comprising:
   a control server in communication with one or more content delivery networks (CDNs) nodes and a client device, the control server including a client controller configured to:
      receive, from at least one of the one or more CDNs, a first manifest corresponding to a first program and defining a plurality of first content segments of the first program available at the at least one CDN;
      receive, from at least one of the one or more CDNs, a second manifest corresponding to a second program and defining a plurality of second content segments of the second program available at the at least one CDN;
      identify a first preliminary manifest from the first manifest, the first preliminary manifest including a first URL, a first reference time, and a first duration received from the one or more CDNs and associated with each of the plurality of first content segments;
      identify a second preliminary manifest from the second manifest, the second preliminary manifest including a second URL, a second reference time, and a second duration received from the one or more CDNs and associated with each of the plurality of second content segments;
      receive client information from the client device, the client information including a selection of at least the first and the second program; and
      generate, based on the client information and at the control server, a first synchronized manifest corresponding to the first program, and a second synchronized manifest corresponding to the second program, the first synchronized manifest identifying the first URLs of selected ones of the first content segments, and the second synchronized manifest identifying the second URLs of selected ones of the second content segments, the first and the second synchronized manifests being aligned based on the reference time and the duration of the selected ones of the first and the second content segments;

transmit the plurality of synchronized manifests to the client device wherein:
each of the first and the second reference time is a synchronized presentation timestamp (SPTS) of the frame beyond the last frame of the last segment in each of the first and the second preliminary manifests, respectively; and the client controller is configured to generate the first and the second synchronized manifests by trimming from beginning of each of the first and the second preliminary manifest to find an earliest segment, n[k], of stream k such that SPTS[n[k],k]<=maxSPTS<(SPTS[n[k],k]+duration[n[k],k])

wherein maxSPTS is max {SPTS[n[k],k]} over all streams k and duration[n,k] is the duration of the nth segment 614 of the stream k.

2. The system of claim 1, the number of selected ones of the first content segments being less than the number of first content segments; the number of selected ones of the second content segments being less than the number of the second content segments.

3. The system of claim 1, each of the first and the second preliminary manifests being identified by the control server based on a window size communicated by the client device, each of the first and the second preliminary manifests identifying a variant manifest, of the master content, for a peak resolution corresponding to a window size associated with the program when displayed on the client device.

4. The system of claim 1, each of the first and the second preliminary manifests being identified by the control server based on a total bandwidth and a bandwidth used by a plurality of client devices on the same network and in communication with the control server.

5. The system of claim 1, each of the first and the second preliminary manifests being identified based on a resolution of the program when displayed at the client device.

6. The system of claim 1, each of the first and the second preliminary manifests being identified based on a player rate buffer level for each of the client media players.

7. The system of claim 1, each of the first and the second preliminary manifests being identified based on total memory and memory used by the client device media players.

8. A method for distributed control of segmented media, comprising:
receiving, at a control server and from at least one of one or more content delivery networks (CDNs), a first manifest corresponding to a first program and defining a plurality of first content segments of the first program available at the at least one CDN;
receiving, at the control server and from the at least one of one or more CDNs, a second manifest corresponding to a second program and defining a plurality of second content segments of the second program available at the at least one CDN;
identifying a first preliminary manifest from the first manifest, the first preliminary manifest including a first URL, a first reference time, and a first duration received from the one or more CDNs and associated with each of the plurality of first content segments received from the one or more CDNs;
identifying a second preliminary manifest from the second manifest, the second preliminary manifest including a second URL, a second reference time, and a second duration received from the one or more CDNs and associated with each of the plurality of second content segments;
receiving, at the control server, client information from a client device, the client information including a selection of at least the first and the second program;
generating, based on the client information and at the control server, a first synchronized manifest corresponding to the first program, and a second synchronized manifest corresponding to the second program, the first synchronized manifest identifying the first URLs of selected ones of the first content segments, and the second synchronized manifest identifying the second URLs of selected ones of the second content segments, the first and the second synchronized manifests being aligned based on the reference time and the duration of the selected ones of the first and the second content segments; and,
transmitting the plurality of synchronized manifests to the client device;
wherein:
each of the first and the second reference time is a synchronized presentation timestamp (SPTS) of the frame beyond the last frame of the last segment in each of the first and the second preliminary manifests, respectively; and
generating the first and the second synchronized manifests includes trimming from beginning of each of the first and the second preliminary manifest to find an earliest segment, n[k], of stream k such that SPTS[n[k],k]<=maxSPTS<(SPTS[n[k],k]+duration[n[k],k])

wherein maxSPTS is max {SPTS[n[k],k]} over all streams k and duration[n,k] is the duration of the nth segment 614 of the stream k.

9. The method of claim 8, the number of content segments of the selected ones of the first content segments being less than the number of first content segments; the number of selected ones of the second content segments being less than the number of the second content segments.

10. The method of claim 8, each of the first and the second preliminary manifests being identified based on a window size communicated by the client device, each of the first and the second preliminary manifest identifying a variant manifest, of the master content, for a peak resolution corresponding to a window size associated with the program when displayed on the client device.

11. The method of claim 8, each of the first and the second preliminary manifests being identified by the control server based on a total bandwidth and a bandwidth used by a plurality of client devices on the same network and in communication with the control server.

12. The method of claim 8, each of the first and the second preliminary manifests being identified based on a resolution of the program when displayed at the client device.

13. The method of claim 8, each of the first and the second preliminary manifests being identified based on a player rate buffer level for each of the client media players.

14. The method of claim 8, each of the first and the second preliminary manifests being identified based on total memory and memory used by the client device media players.

15. The system of claim 1, wherein the synchronized manifests are configured to prevent the client device from choosing what variant of the first and the second programs to play at the client device.

16. The method of claim 8, wherein the synchronized manifests are configured to prevent the client device from choosing what variant of the first and the second programs to play at the client device.

\* \* \* \* \*